United States Patent [19]
Nishioka

[11] Patent Number: 5,984,702
[45] Date of Patent: Nov. 16, 1999

[54] APPARATUS FOR EJECTING AN INTEGRATED CIRCUIT CARD FROM AN ELECTRONIC DEVICE

[75] Inventor: Toru Nishioka, Furukawa, Japan

[73] Assignee: Alps Electric Co., Ltd., Japan

[21] Appl. No.: 09/154,791

[22] Filed: Sep. 17, 1998

[30] Foreign Application Priority Data

Sep. 19, 1997 [JP] Japan .................................. 9-255392
Jan. 13, 1998 [JP] Japan .................................. 10-004786

[51] Int. Cl.$^6$ .................................................. H01R 13/62
[52] U.S. Cl. ........................................................... 439/159
[58] Field of Search .................................. 439/159, 155, 439/157, 160

[56] References Cited

U.S. PATENT DOCUMENTS 5,275,573  1/1994  McCleerey .............................. 439/159
5,499,925  3/1996  Lwee ...................................... 439/157

*Primary Examiner*—Neil Abrams
*Assistant Examiner*—Javaid Nasri
*Attorney, Agent, or Firm*—Brinks Hofer Gilson & Lione

[57] ABSTRACT

In an IC card connector device capable of holding a push rod 4 at a push position while an IC card 1 is connected, a heart-shaped cam groove 10 capable of holding the push rod 4 at two positions or a push position and a projecting position in association with a first transmission pin 15 and a circulating type cam groove 11 and an escape groove 12 which are selectively traced by a second transmission pin 16 in accordance with a projecting amount of the push rod 4 are formed on the outside surface of a frame 3 having a guide groove 3a which is formed on the inside surface thereof and into and from which the IC card 1 is inserted and withdrawn and the receiving portion 13b of a drive plate 13 which associates with an eject arm 5 is permitted to enter into and exit from the circulating type cam groove 11. With this arrangement, the discharge operation and the cancel operation of the IC card 1 can be selectively done in accordance with a projecting amount of the push rod 4 and the size of the eject mechanism 5 can be reduced.

10 Claims, 11 Drawing Sheets

FIRST PROJECTING POSITION ——————
SECOND PROJECTING POSITION ------

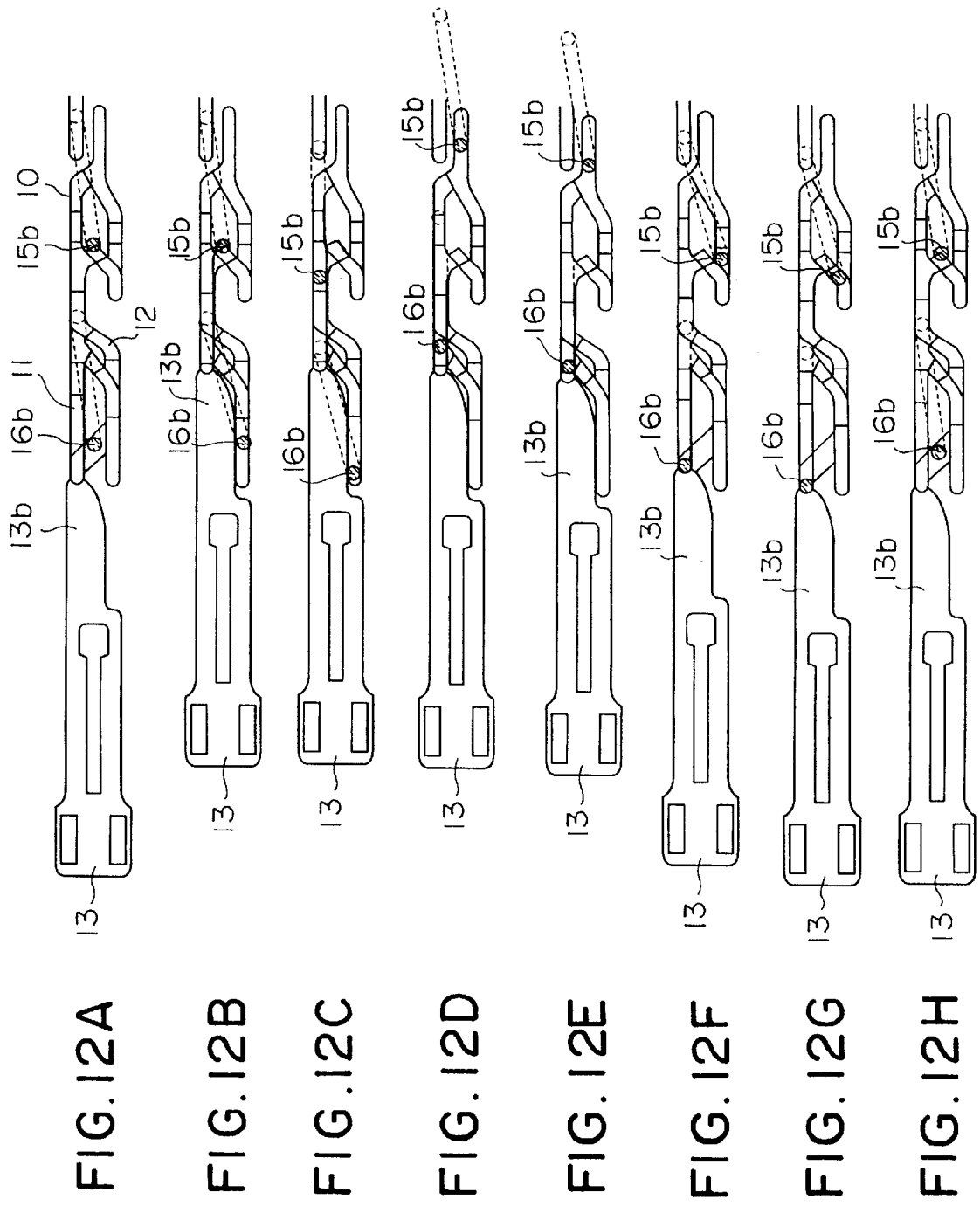

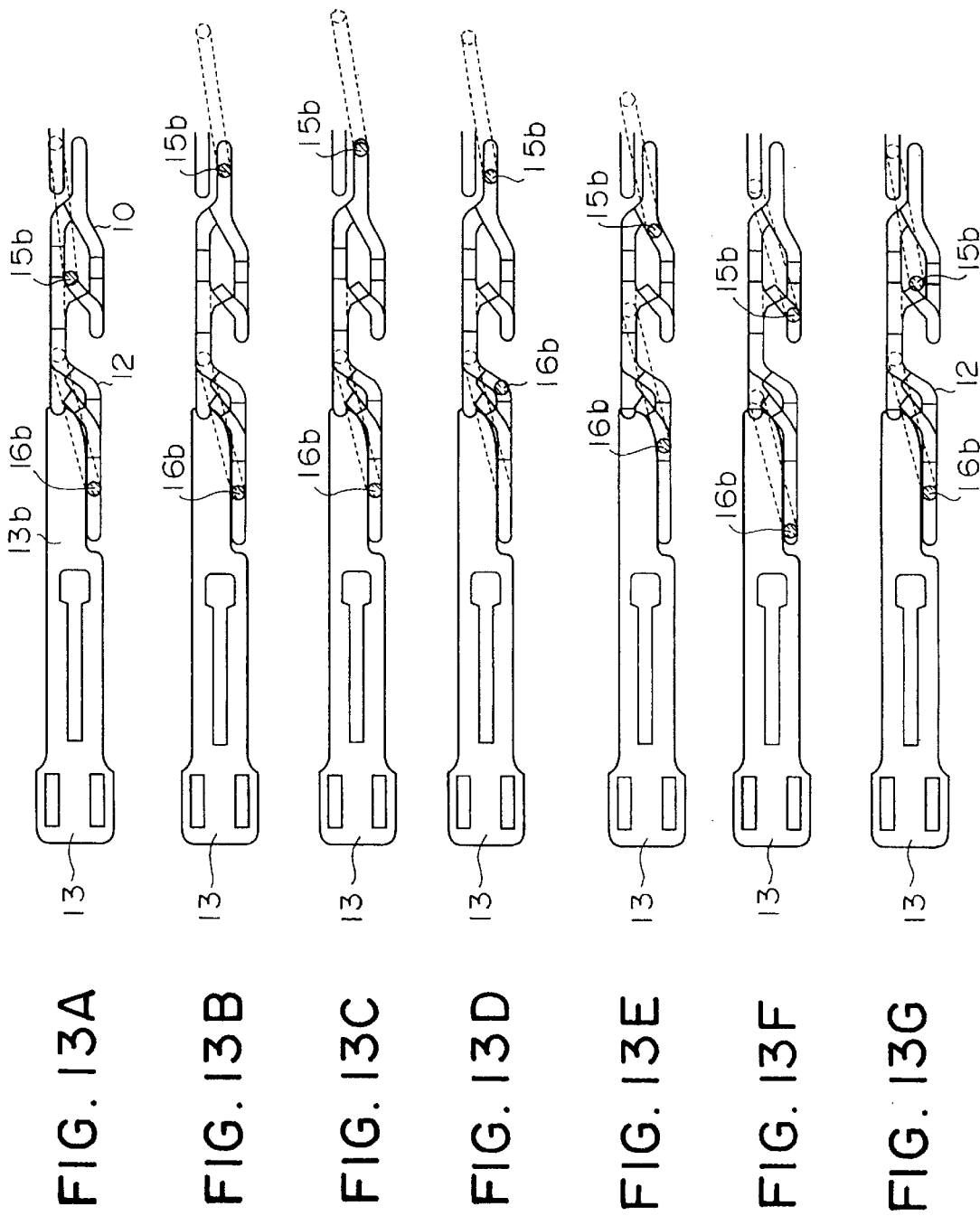

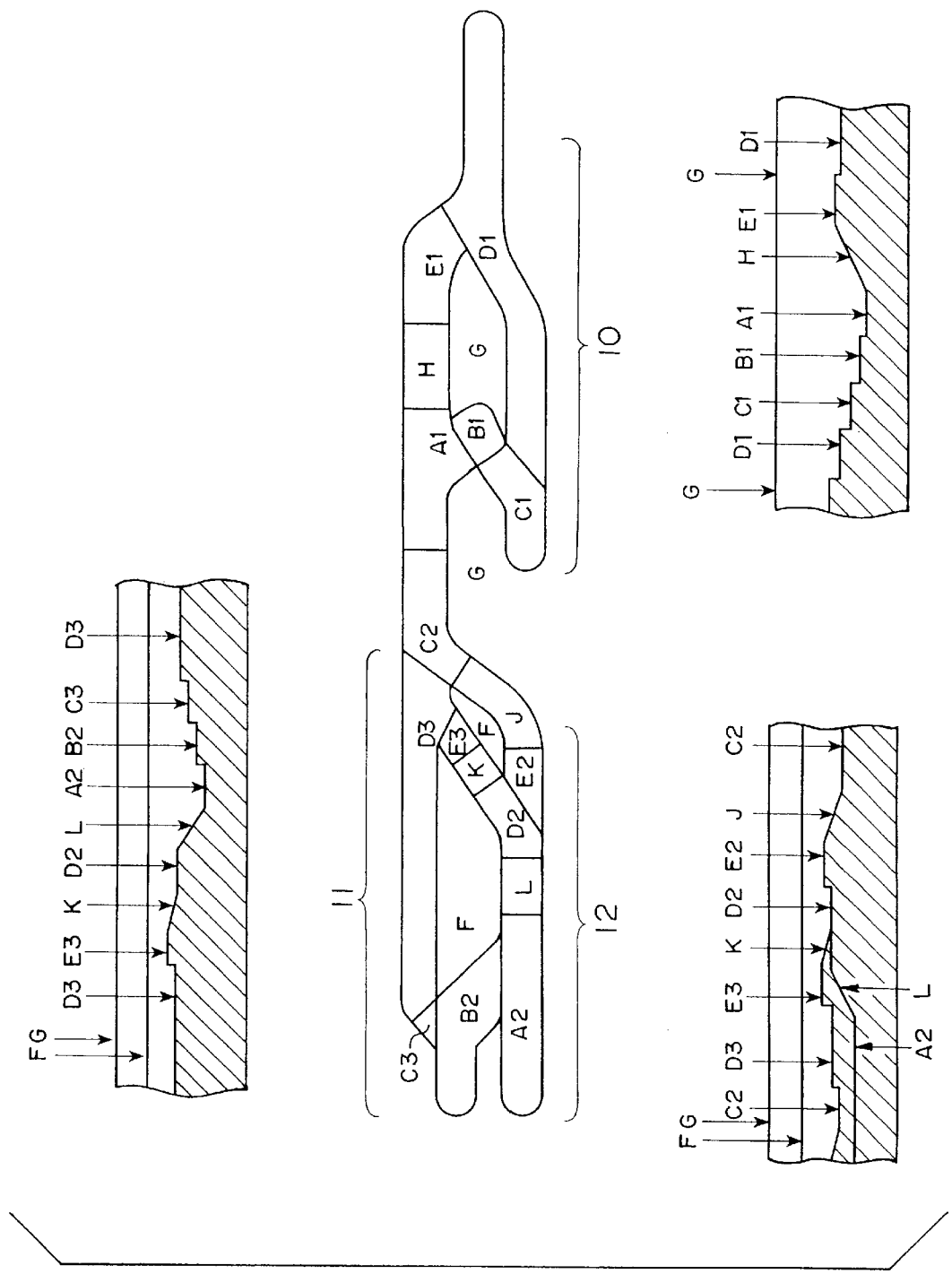

APPARATUS FOR EJECTING AN INTEGRATED CIRCUIT CARD FROM AN ELECTRONIC DEVICE

BACKGROUND OF THE INVENTION

1. Field of the Invention

The present invention relates to an IC card connector device provided with equipment which is used by inserting and withdrawing an IC card thereinto and therefrom, and more specifically, to an eject mechanism for discharging a loaded IC card.

2. Description of the Related Art

Usually, IC card connector devices are schematically arranged such that they include a pin header unit in which a multiplicity of pin contacts to be connected to socket contacts in an IC card are disposed in a housing, frames for guiding the IC card when it is inserted or withdrawn, an eject mechanism for releasing the loaded IC card from the pin contacts, and the like. There are also known IC card connector devices which include a pin housing formed integrally with frames.

Conventionally, widely employed eject mechanisms are composed of a push rod held on the outside surface of a frame so as to reciprocate in the insertion/withdrawal direction of an IC card and an eject lever turnably supported by the frame or a pin housing with an end of the eject lever engaged with the push rod. When the push rod is pushed in an IC card connector device provided with this type of the eject mechanism in the state that the IC card is loaded, since the claw portion of the eject lever which turns in association with the push rod presses the IC card toward the operator's side, the operator can simply draw out the IC card with his fingers. However, this arrangement has such a drawback that since the push rod projects toward the operator's side in the state that the IC card is loaded, the IC card is discharged against the operator's intention by the erroneous operation of the projecting push rod.

Whereas, the IC card connector device disclosed in Japanese Unexamined Utility Model Publication No. 6-13072 comprises first and second transmission levers which couple a push rod with a slide plate through a link, a third transmission lever which is turnably supported by the first transmission lever and engaged with and disengaged from the second transmission lever and a heart-shaped cam mechanism which can hold the push rod at a push position and a first projecting position so that the push force of the push rod can be selectively transmitted to the slide plate in accordance with a projecting amount of the push rod. That is, when an IC card is loaded, the push rod is held at the push position and the third transmission lever is not engaged with the second transmission lever. However, when the push rod is projected up to the first projecting position by the heart-shaped cam mechanism and thereafter it is further pulled to a second projecting position on the operator's side, the third transmission lever is engaged with the second transmission lever at the second projecting position. Thus, when the push rod is pressed in the direction of the push position in this state, the press force is transmitted to the slide plate through the respective transmission levers so that the slide plate presses the IC card to the operator's side. Therefore, the IC card can be prevented from being discharged against the operator's intention in such a manner that the push rod is held at the push position while the IC card is connected and projected up to the push position only when the IC card is discharged.

As described above, according to the IC card connector device disclosed in the above publication, since the push rod is held at the push position while the IC card is connected and projected only when the IC card is discharged, the IC card can be prevented from being discharged against the operator's intention. Further, when the push rod is erroneously projected regardless of that the operator does not desire to discharge the IC card, the push rod can be held at the push position again without discharging the IC card by pushing the push rod from the first projecting position without pulling it to the second projecting position, whereby the operability of an eject operation can be improved.

However, the above IC card connector device has a problem that an eject operation is troublesome because it requires to perform the operation three times in ordinary eject operation, that is, an operation for projecting the push rod held at the push position up to the first projecting position, an operation for pulling out the push rod located at the first projecting position up to the second projecting position and an operation for pushing the push rod projected to the second projecting position to the push position. Further, there still remains a problem that when the push rod is erroneously projected up to the second projecting position, the IC card is discharged against the operator's intention. There is also a problem that since the three transmission levers coupled with each other through the link are interposed between the push rod and the slide plate and the press force of the push rod is transmitted to or shut off from the slide plate in accordance with the attitude of the respective transmission levers, a large space is necessary to turn the respective transmission levers and the miniaturization of the IC card connector device is prevented by it. Since the respective transmission levers must be inevitably disposed to the top surface or bottom surface of an IC card insertion port because of the above reasons, and in particular, since a plurality of sets of the respective transmission levers must be disposed in a vertically piled state by securing a sufficient space in an IC card connector device which permits at least two IC cards to be inserted thereinto and withdrawn therefrom, there is caused a problem that the size of the IC card connector device is increased in a height direction.

SUMMARY OF THE INVENTION

According to the present invention, a first transmission pin and a second transmission pin are turnably attached to a push rod, the lock mechanism of the first transmission pin permits the push rod to reciprocate between a push position and a first projecting position as well as the push rod to move to a second projecting position which further projects from the first projecting position so that an IC card can be discharged by turning the second transmission pin when the push rod located at the second projecting position is pushed. With this arrangement, since the IC card in a loaded state can be discharged by the second transmission pin in such a manner that after the push rod is projected up to the first projecting position from the push position making use of the lock mechanism of the first transmission pin, the push rod is pushed in the direction of the push position at the first projecting position, an eject operation as an ordinary mode of use can be simply carried out. If the push rod should be erroneously projected regardless of that the discharge of the IC card is not desired, although this operation seldom happens as compared with the ordinary eject operation, the push rod is pushed in the direction of the push position after it is projected up to the second projecting position which is nearer to the operator's side than the first projecting position. With this operation, since the discharge of the IC card is cancelled by the turning motion of the second transmission pin, the IC card can be maintained in the inserted state.

An IC card connector device of the present invention, which includes frames for supporting an IC card so that it can be inserted and withdrawn, a push rod capable of reciprocating between a push position and a projecting position and first and second transmission pins turnably attached to the push rod, in which when the IC card is inserted, the push rod is located at the push position by the lock mechanism of the first transmission pin, the lock mechanism of the first transmission pin is released by the first push motion of the push rod in this state to thereby move the push rod to a first projecting position and the IC card is discharged by the second transmission pin in accordance with the second push motion of the push rod, is arranged such that the push rod is permitted to move to a second projecting position which is further projecting from the first projecting position, when the push rod is located at the first projecting position, the push rod is moved to the second projecting position by the pull motion thereof and when the push rod is pushed at the second projecting position, the second transmission pin is turned to thereby cancel the discharge of the IC card.

An IC card connector device comprises a drive plate capable of performing a reciprocating motion, wherein the drive plate presses the push rod located at the first projecting position, the second transmission pin moves the drive plate and the IC card is discharged through the drive plate.

When the push rod is located at the first projecting position, the second transmission pin confronts the drive plate and when the push rod is moved to the push position by a push motion in the state that the push rod is located at the first projecting position, the second transmission pin moves the drive plate to thereby discharge the IC card, whereas when the push rod is pushed after it is moved from the first projecting position to the second projecting position, the confrontation between the second transmission pin and the drive plate is cancelled to thereby eliminate the movement of the drive plate caused by the movement of the second transmission pin to thereby cancel the discharge of the IC card.

An IC card connector comprises a circulating cam groove and an escape groove, wherein the second transmission pin traces the circulating cam groove and the escape groove in one direction and when the push rod is pushed at the second projecting position, the second transmission pin traces the escape groove to thereby cancel the confrontation of the second transmission pin and the drive plate.

When the IC card is discharged, the track of the second transmission pin engaged with the circulating cam groove is displaced to thereby cancel the confrontation of the second transmission pin and the drive plate.

The first transmission pin traces the heart-shaped cam groove in one direction.

After the second transmission pin engaged with the circulating cam groove discharges the IC card and falls to a next lower cam surface of the circulating cam groove, the first transmission pin engaged with the heart-shaped cam groove falls to a next lower cam surface of the heart-shaped cam groove.

Each of the first and second transmission pins is formed to a U-shape having an upper side portion and bent portions formed to both the ends of the upper side portion, first and second projections are formed to the push rod, the upper side portion of the first transmission pin is abutted against the first projection and the upper side portion of the second transmission pin is abutted against the second projection as well as one end of one of the bent portions of the first transmission pin is engaged with the heart-shaped cam groove and one end of one of the bent portions of the second transmission pin is engaged with the circulating cam groove and the escape groove and the first and second transmission pins are elastically pressed between the bent portion of the first transmission pin and the first projection and between the bent portion of the second transmission pin and the second projection.

The bent portions formed to both the ends of each of the first and second U-shaped transmission pins are formed to the same length.

BRIEF DESCRIPTION OF THE DRAWINGS

FIGS. 12A–12H is a view describing an ordinary eject operation;

FIGS. 13A–13G is a view describing a cancel operation;

FIG. 14 is a view describing the heights of the respective cam surfaces of a heart-shaped cam groove, a circulating type cam mechanism and an escape groove provided with an IC card connector device according to a second embodiment.

DESCRIPTION OF THE PREFERRED EMBODIMENTS

Figure 1:
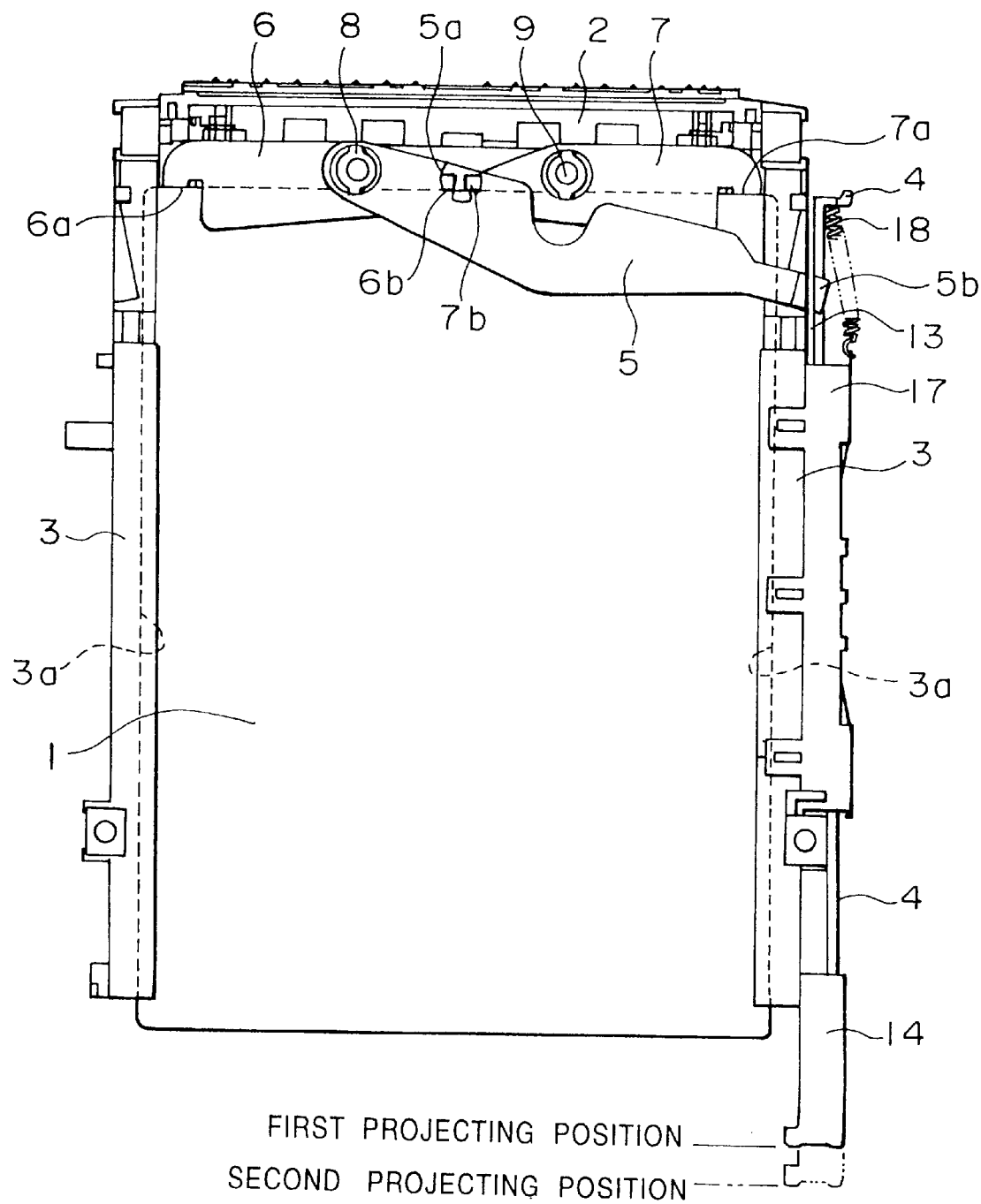
FIG. 1 is a plan view showing the state that an IC card is loaded on an IC card connector device according to a first embodiment.
Figure 3:
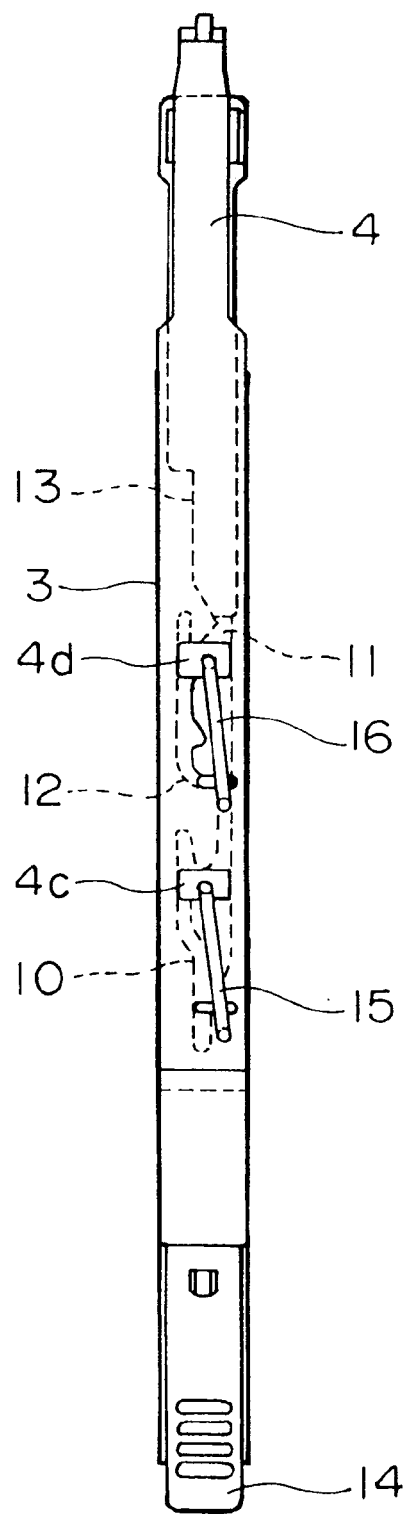
FIG. 3 is a side elevational view showing the main portion of an ejection mechanism provided with the connector device.
Figure 4:
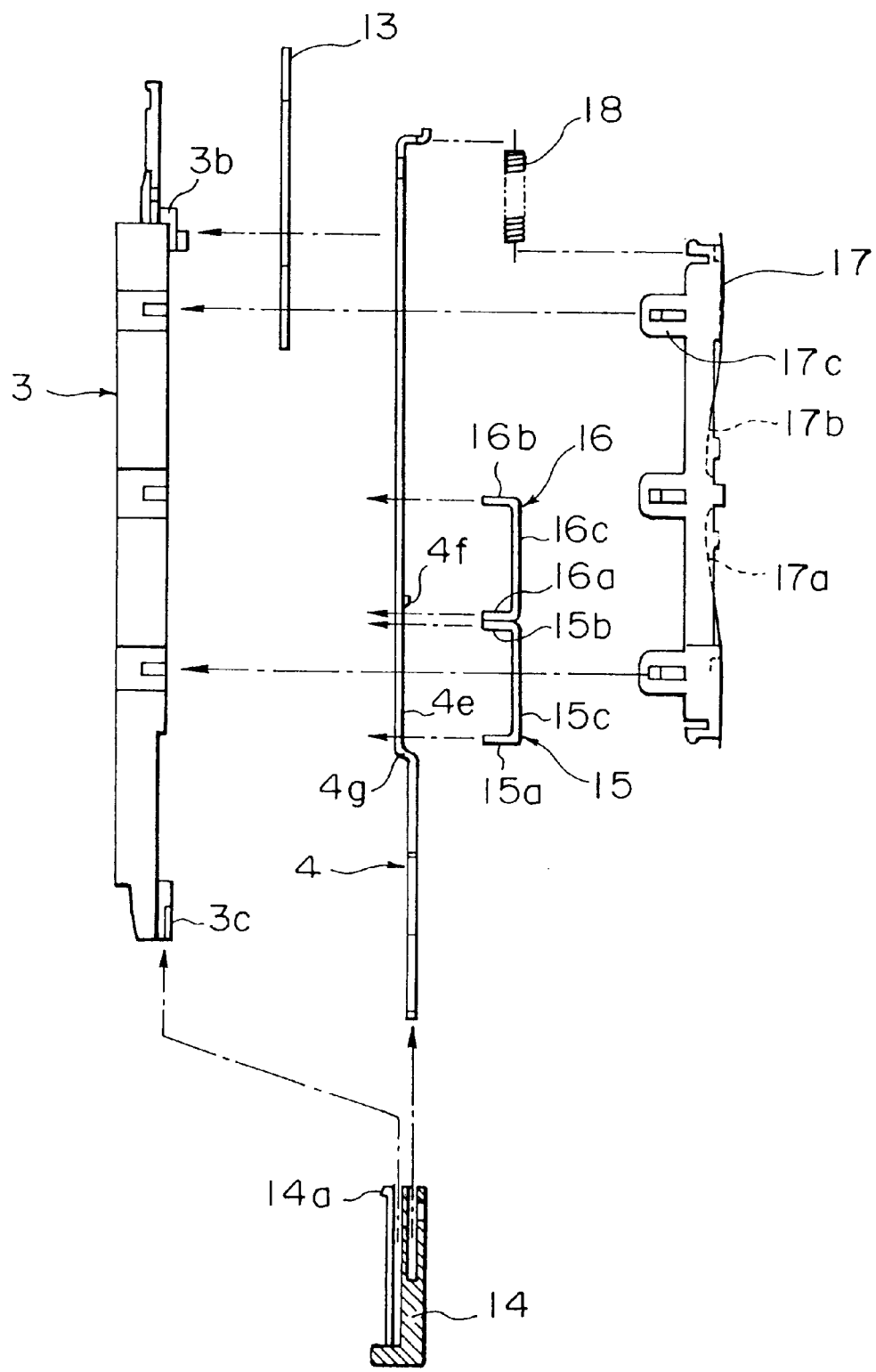
FIG. 4 is an exploded view of the ejection mechanism.
Figure 5:
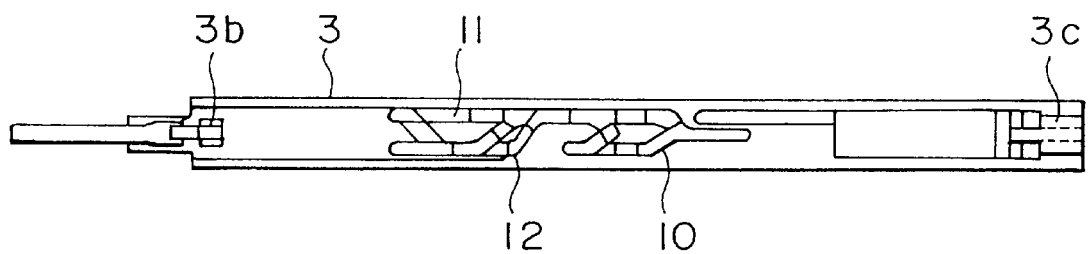
FIG. 5 is a side elevational view of a frame.
Figure 6:
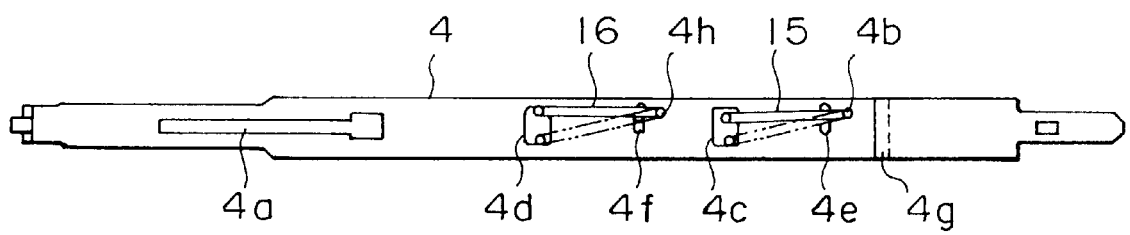
FIG. 6 is a side elevational view of a push rod.
Figure 7:
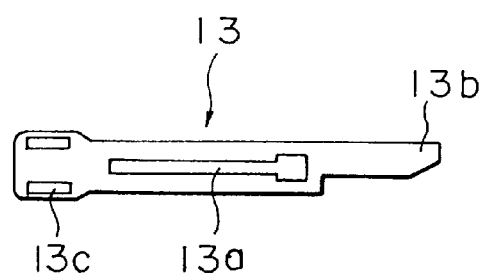
FIG. 7 is a side elevational view of a drive plate.
Figure 8:
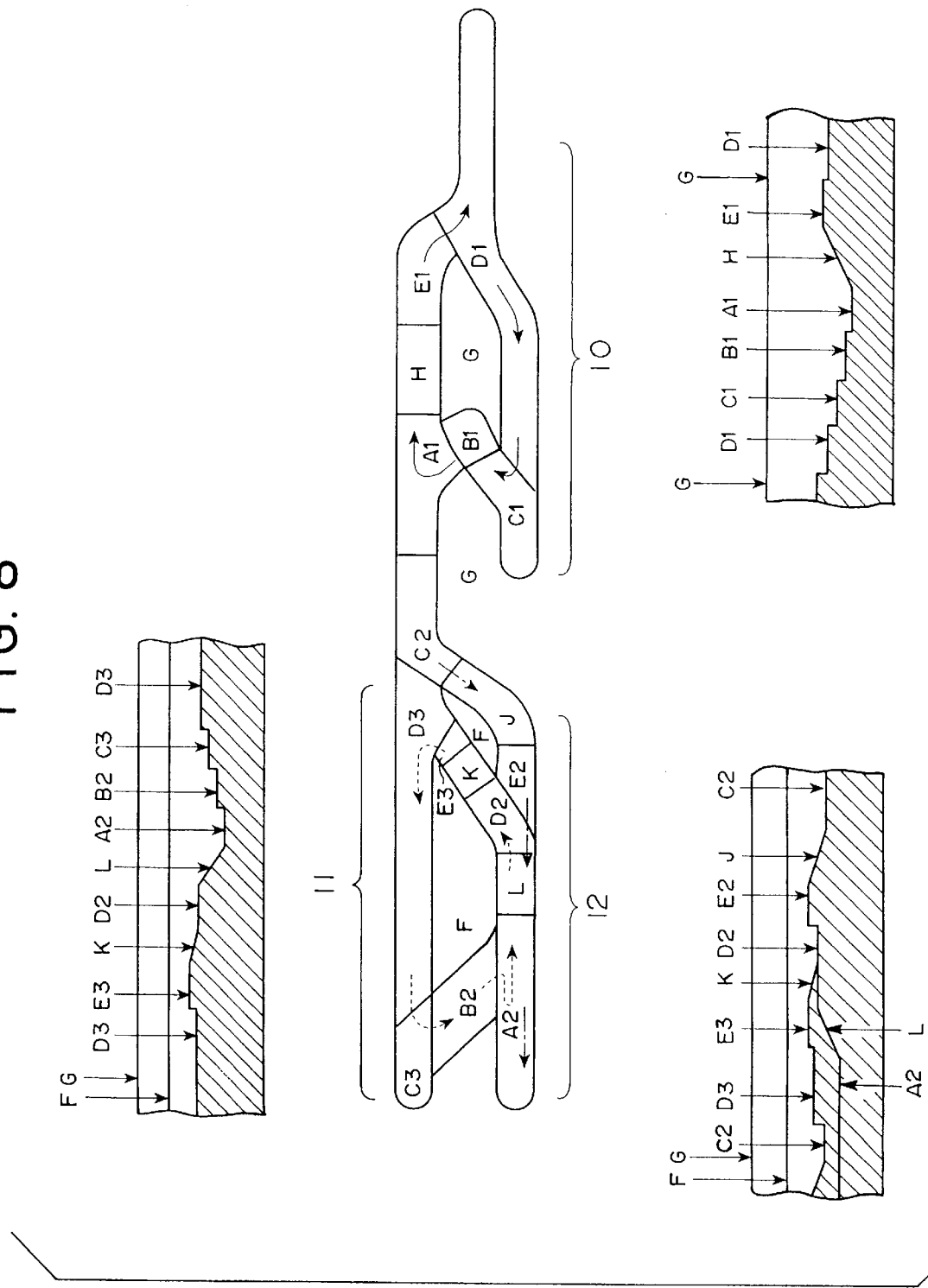
FIG. 8 is a view describing the heights of the respective cam surfaces of a heart-shaped cam groove, a circulating type cam mechanism and an escape groove.
Figure 9:
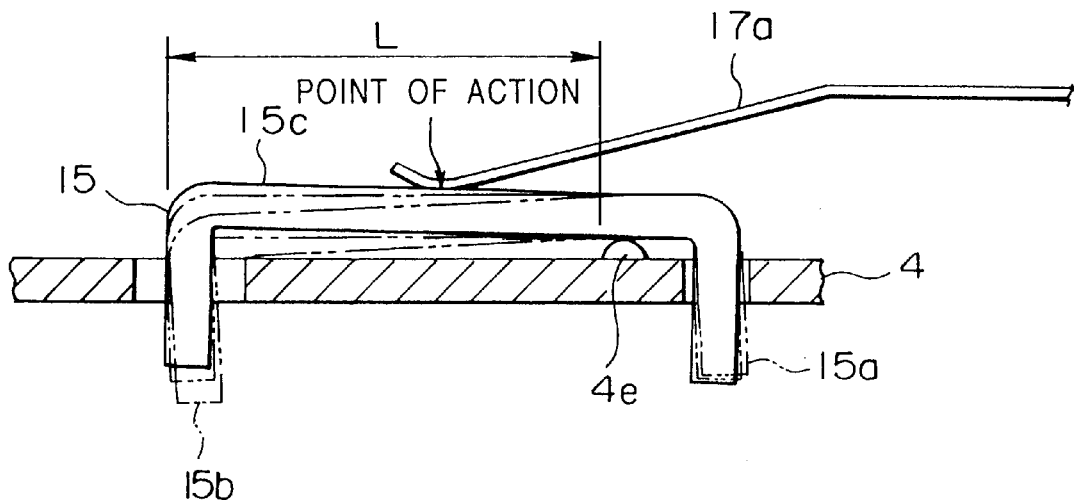
FIG. 9 is a view describing the elastically pressed state of a first transmission pin.
Figure 10:
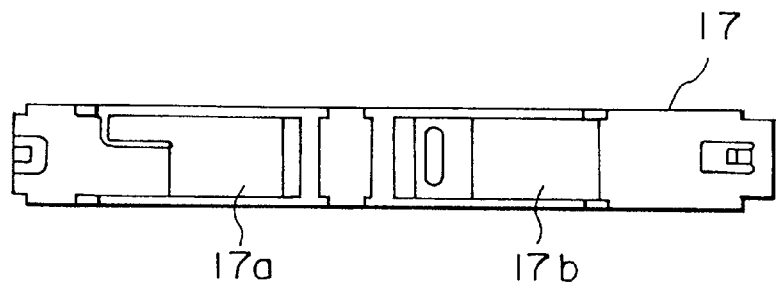
FIG. 10 is a side elevational view of a mounting plate.
Figure 11:
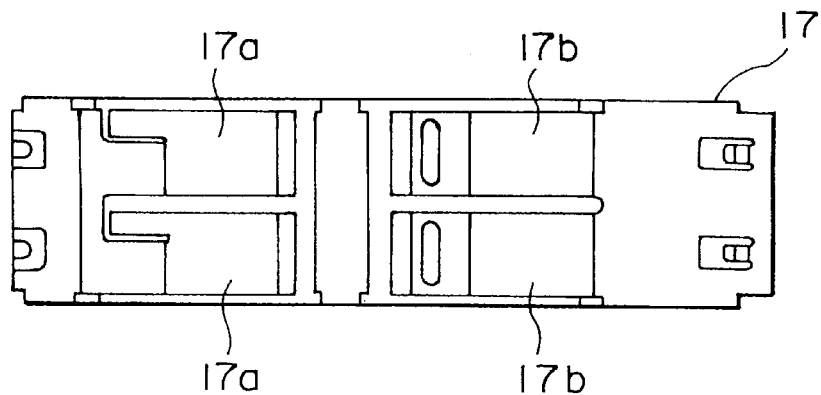
FIG. 11 is a side elevational view of the mounting plate.

Embodiments will be described with reference to drawings. FIG. 1 is a plan view showing the state that an IC card is loaded on an IC card connector device according to a first embodiment of the present invention, FIG. 2 is a plan view showing the state just after the IC card is removed from the connector device, FIG. 3 is a side elevational view showing the main portion of an eject mechanism provided with the connector device, FIG. 4 is an exploded view of the eject mechanism, FIG. 5 is a side elevational view of a frame, FIG. 6 is a side elevational view of a push rod, FIG. 7 is a side elevational view of a drive plate, FIG. 8 is a view describing the heights of the respective cam surfaces of a heart-shaped cam groove, a circulating type cam mechanism and an escape groove, FIG. 9 is a view describing the elastically pressed state of a first transmission pin, FIG. 10 and FIG. 11 are side elevational views of a mounting plate, FIG. 12 is a view describing an ordinary eject operation and FIG. 13 is a view describing a cancel operation.

Figure 2:
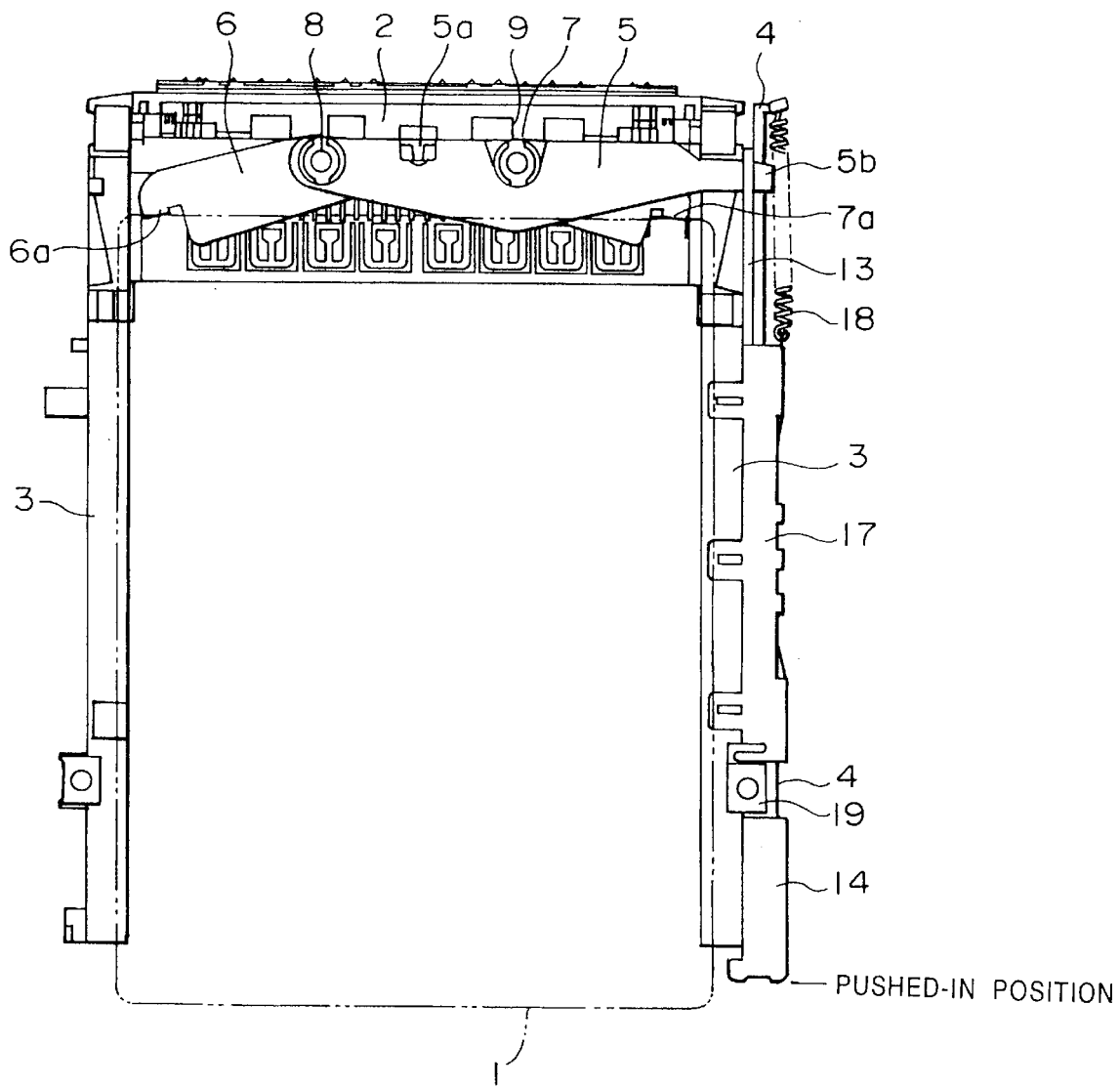
FIG. 2 is a plan view showing the state just after the IC card is removed from the connector device.

As shown in FIG. 1 and FIG. 2, the IC card connector device according to the embodiment mainly comprises a pin housing 2 to which a multiplicity of pin contacts (none of them are shown) are inserted under pressure and fixed in a predetermined arrangement so that the socket contacts in an IC card are connected thereto, a pair of frames 3 fixed to both the right and left sides of the pin housing 2 for guiding the IC card from both the sides in the width direction thereof when it is inserted or withdrawn, a push rod 4 attached to one of the frames 3, an eject arm 5 turnably supported by the pin housing 2, first and second turning arms 6, 7 and the like and an eject mechanism which will be described later is interposed between the push rod 4 and the eject arm 5.

A first support shaft 8 and a second support shaft 9 are provided with the pin housing 2 with a specific interval defined therebetween and an end of the eject arm 5 is turnably supported by the first support shaft 8. A coupling hole 5a and an engaging portion 5b are formed to the eject arm 5 and the engaging portion 5b projects to the outside of the frame 3. The first turning arm 6 is also turnably supported by the first support shaft 8 and a claw piece 6a for pushing out the IC card 1 and a tongue piece 6b projecting into the coupling hole 5a of the eject arm 5 are formed to the first turning arm 6. The second turning arm 7 is turnably supported by the second support shaft 9 and a claw piece 7a for pushing out the IC card 1 and a tongue piece 7b projecting into the coupling hole 5a of the eject arm 5 are formed to the second turning arm 7.

The arrangement of the eject mechanism will be described below in detail based on FIG. 3 to FIG. 11. The IC card connector device shown in the embodiment can be loaded with the two IC cards 1 along the upper and lower two-level guide grooves 3a which are formed to the inside surfaces of both the frames 3 and the two push rods 4 are disposed on the outside surface of one of the frames 3. However, since both the push rods 4 have fundamentally the same function and arrangement, one of the push rods 4 and the eject mechanism thereof will be described below. (FIG. 3 shows only one of the eject mechanisms and omits the other of them.)

As shown in FIG. 5, a pair of guide projections 3b, 3c are disposed to the outside surface of the frame 3 and a heart-shaped cam groove 10, a circulating type cam groove 11 and an escape groove 12 are engraved between the guide projections 3b, 3c. As shown in FIG. 8, each of these heart-shaped cam groove 10, circulating type cam groove 11 and escape groove 12 has a plurality of cam surfaces having a different height and the cam surface A1 of the heart-shaped cam groove 10 is continuous to the cam surface C2 of the escape groove 12. The circulating type cam groove 11 and the escape groove 12 have cam surfaces A, L, D2 which are partially common to each other and the cam surface D3 of the circulating type cam groove 11 is continuous to the cam surface C2 of the escape groove 12 on a line extended from the cam surface A1 of the heart-shaped cam groove 10.

A drive plate 13 is held on the outside surface of the frame 3 so as to reciprocate on it. As shown in FIG. 7, the drive plate 13 has a guide hole 13a which is inserted into one of the guide projections or the guide projection 3b. A receiving portion 13b whose extreme end is formed to a taper shape is formed to the drive plate 13 and reciprocates just above the cam surface C3 and cam surface D3 of the circulating type cam groove 11. Further, an engaging hole 13c is formed to the drive plate 13 and the engaging portion 5b of the eject arm 5 passes through the frame 3 and is engaged with the engaging hole 13c of the drive plate 13.

The push rod 4 is assembled to the outside surface of the frame 3 from the upper side of the drive plate 13 and held by both the guide projections 3b, 3c so that it can reciprocate along the direction in which the IC card is inserted and withdrawn. A knob 14 is attached to an end of the push rod 4 and a locking claw 14a which can be engaged with and disengaged from the guide projection 3c is formed to the lower surface of the push rod 4. As shown in FIG. 6, a guide hole 4a is formed to the push rod 4 and inserted into the guide projection 3b of the frame 3. Further, a pair of shaft holes 4b, 4h and first and second escape holes 4c, 4d are formed to the push rod 4 and projections 4e and 4f are formed between the shaft hole 4b and the first escape hole 4c and between the shaft hole 4h and the second escape hole 4d, respectively.

A first transmission pin 15 and a second transmission pin 16 each bend to a U-shape are held on the outside surface of the push rod 4. The first transmission pin 15 has a pair of arm portions 15a, 15b formed to both the ends of the upper side portion 15c thereof and both the arm portions 15a, 15b have the same length. One of the arm portions or the arm portion 15a is inserted into the shaft hole 4b of the push rod 4, the other of them or the arm portion 15b passes through the first escape hole 4c and is engaged with the respective cam surfaces of the heart-shaped cam groove 10 and the first transmission pin 15 can swing about the shaft hole 4b as a fulcrum. The second transmission pin 16 also has a pair of arm portions 16a, 16b formed to both the ends of the upper side portion 16c thereof and both the arm portions 16a, 16b have the same length. One of the arm portions or the arm portion 16a is inserted into the shaft hole 4h of the push rod 4, the other of them or the arm portion 16b passes through the second escape hole 4d and is selectively engaged with the respective cam surfaces of the circulating type cam groove 11 and the escape groove 12 and the second transmission pin 16 can swing about the shaft hole 4h as a fulcrum.

At the time, the frictional resistance between the push rod 4 and both the transmission pins 15, 16 is reduced by the swing motion of the upper side portion 15c of the first transmission pin 15 and the upper side portion 16c of the second transmission pin 16 performed on the projections 4e, 4f, respectively. Since both the arm portions 15a, 15b of the first transmission pin 15 are formed to the same length and both the arm portions 16a, 16b of the second transmission pin 16 are also formed to the same length, the first transmission pin 15 and the second transmission pin 16 may be assembled to the push rod 4 in any direction, whereby an assembly job can be carried out easily.

Since a mounting plate 17 is attached to the outside surface of the frame 3 from the upper side of the push rod 4 so as to cover the push rod 4, the removal of the push rod 4 and the first and second transmission pins 15, 16 is prevented by the mounting plate 17. A pair of elastic pieces 17a, 17b are formed to the mounting plate 17 by cutting out and raising a portion thereof as well as a plurality of bent mounting leg 17c are formed thereto and secured to the frame 3 by snap coupling. As shown in FIG. 9, one of the elastic pieces or the elastic piece 17a is in elastic contact with the upper side portion 15c of the first transmission pin 15 and the first transmission pin 15 is elastically urged in the direction of the outside surface of the frame 3 by the elastic piece 17a. At the time, since the point of action of the elastic piece 17a is set between the projection 4e and the arm portion 15b, that is, within the range shown by an arrow L in the drawing, the arm portion 15b of the first transmission pin 15 is urged in the direction of the cam surface of the heart-shaped cam groove 10 about the projection 4e as a fulcrum so that it cam securely trace the respective cam surfaces. Since the other of the elastic pieces or the elastic piece 17b of the mounting plate 17 is in elastic contact with the upper side portion 16c of the second transmission pin 16, the second transmission pin 16 is elastically urged in the direction of the outside surface of the frame 3 by the elastic piece 17b. Although omitted from the drawing, the point of action of the elastic piece 17b is also set between the projection 4f and the arm portion 16b likewise the aforesaid elastic piece 17a in order to ensure that the arm portion 16b can securely trace the respective cam surfaces of the circulating type cam groove 11 and the escape groove 12.

The number of the elastic pieces 17a, 17b are increased or decreased depending upon the number of levels of the guide grooves 3a formed to the frame 3. For example, when the frame 3 has the guide groove 3a formed to one level in correspondence to one piece of the IC card 1, a pair of the elastic pieces 17a, 7b are formed to the single mounting plate 17 as shown in FIG. 10, whereas when the frame 3 has the guide grooves 3a formed to two levels in correspondence to two pieces of the IC cards 1, each two, that is, four in total of the elastic pieces 17a, 7b are formed to the single mounting plate 17 as shown in FIG. 11 and this arrangement is also applicable likewise when the frame 3 has the guide grooves 3a formed to three levels or more. Although the integral formation of the elastic pieces 17a, 17b with the single mounting plate 17 can reduce a cost by the decrease of the number of parts, it is also possible to divide the mounting plate 17 into two portions and form the elastic pieces 17a, 17b to the individual mounting plates 17. A coil spring 18 is stretched between the mounting plate 17 and the push rod 4 is urged by the coil spring 18 in the direction where it projects from the front surface of the frame 3.

The arm portion 15b of the first transmission pin 15 traces the respective cam surfaces of the heart-shaped cam groove 10 in the direction of the arrows of solid lines shown in FIG. 8 in association with the push motion of the push rod 4. When the arm portion 15b is locked to a cam surface B1, the push rod 4 is held at the push position shown in FIG. 2 and the arm portion 15b moves from a cam surface E1 to a cam surface D1 and when the locking claw 14a of the knob 14 is engaged with the guide projection 3c of the frame 3, the push rod 4 is held at the first projecting position shown in FIG. 1. Further, the push rod 4 can be moved to a second projecting position which is nearer to the operator's side than the first projecting position against the engaging force of the locking claw 14a of the knob 14 with the guide projection 3c and the bent portion 4g of the push rod 4 is abutted against a mounting fitting 19 secured to the frame 3 at the second projecting position. On the other hand, the arm portion 16b of the second transmission pin 16 selectively traces the respective cam surfaces of the circulating type cam groove 11 in the direction of the arrows shown by broken lines in FIG. 8 or the respective cam surfaces of the escape groove 12 in the direction of the arrows shown by dot-dash-lines in FIG. 8 and this selective motion is carried out when the push rod 4 is moved from the first projecting position up to the second projecting position.

An ordinary operation mode for loading the IC card and thereafter discharging it in the IC card connector device arranged as described above will be described mainly with reference to FIG. 12. First, when the IC card is not loaded, the push rod 4 is held at the push position of FIG. 2. At the time, the arm portion 15b of the first transmission pin 15 is locked to the cam surface B1 of the heart-shaped cam groove 10, the arm portion 16b of the second transmission pin 16 is engaged with the cam surface B2 of the circulating type cam groove 11 and the push rod 4 is stably held at the push position by the tensile strength of the coil spring 18 and the first transmission pin 15 locked to the cam surface B1 as shown in FIG. 12A.

When the IC card 1 is being inserted along the guide groove 3a of the frame 3, the IC card 1 moving toward the pin housing 2 causes the pin contacts of the pin housing 2 to be inserted into the socket contacts thereof under pressure while pushing the claw pieces 6a, 7a of the first and second turning arms 6, 7. Thus, the insertion of the IC card 1 in a specific amount finishes the loading thereof with the secure connection of the IC card to the respective contact pins. At the time, since the first turning arm 6 and the second turning arm 7 turn in an opposite direction each other using the first support shaft 8 and the second support shaft 9 as their axis of turn, respectively and the turn of the turning arms 6, 7 is transmitted to the eject arm 5 through the portion where the tongue pieces 6b, 7b are coupled with the coupling hole 5a, the eject arm 5 turns using the first support shaft 8 as its axis of turn and the drive plate 13 moves toward the operator's side of the frame 3 in association with the turn. With this operation, although the receiving portion 13b of the drive plate 13 moves just above the circulating type cam groove 11 and the taper of the receiving portion 13b causes the arm portion 16b of the second transmission pin 16 to move from the cam surface B2 of the circulating type cam groove 11 to the cam surface A2 thereof as shown in FIG. 12B, since the arm portion 15b of the first transmission pin 15 remains locked to the cam surface B of the heart-shaped cam groove 10, the push rod 4 is maintained in the state that it is held at the push position while the IC card 1 is connected.

To discharge the IC card 1 from this state, first, the push rod 4 held at the push position is pushed forward and the knob 14 of the push rod 4 is projected up to the first projecting position as shown in FIG. 1. At the time, when the push rod 4 held at the push position is pushed, the arm portion 15b of the first transmission pin 15 is moved from the cam surface B1 of the heart-shaped cam groove 10 to the cam surface A1 thereof and then moved from the cam surface A1 to the cam surface D1 through a cam surface H and a cam surface E1 by the tensile strength of the coil spring 18 as shown in FIG. 12C. At the same time, since the arm portion 16b of the second transmission pin 16 is moved from the cam surface A2 of the circulating type cam groove 11 to the cam surface D3 through the cam surfaces L, D2, K, E3 thereof, the arm portion 16a of the second transmission pin 16 confronts the receiving portion 13b of the drive plate 13 on the can surface D3 as shown in FIG. 12D.

When the knob 14 of the push rod 4 is pushed in the direction of the push position after the push rod 4 is projected up to the first projecting position, since the arm portion 15b of the first transmission pin 15 is locked to the cam surface B1 passing through the cam surface C1 from the cam surface D1 as shown in FIG. 12E to FIG. 12H, the push rod 4 is held at the push position again. At the same time, since the arm portion 16b of the second transmission pin 16 returns from the cam surface D3 of the circulating type cam groove 11 to a cam surface B2 through a cam surface C3 and the arm portion 16a of the second transmission pin 16 presses the receiving portion 13b of the drive plate 13 in the above moving process, the eject arm 5 engaged with the drive plate 13 is turned. As a result, since the turning motion of the eject arm 5 causes the claw pieces 6a, 7a of the first and second turning arms 6, 7 to press both the ends of the front surface of the IC card 1 in a release direction approximately straightly, the socket contacts of the IC card 1 inserted into the contact pins of the pin housing 2 under pressure are released therefrom as shown by a two-dot-anddash-line in FIG. 2. Consequently, the IC card 1 can be simply discharged from the IC card connector device by pulling it out while taking the operator's side thereof with fingers.

Next, a cancel mode for returning the push rod 4 to the push position without discharging the IC card 1 when the push rod 4 is erroneously projected after the IC card 1 is loaded will be described mainly with reference to FIG. 13. FIG. 13A shows the state that the push rod 4 is held at the push position after the IC card 1 is loaded. When the push rod 4 is erroneously pushed forward in this state regardless of that the discharge of the IC card 1 is not desired, the push rod 4 projects up to the first projecting position as described above and the arm portion 16a of the second transmission pin 16 confronts the receiving portion 13b of the drive plate 13 on the cam surface D3 of the circulating type cam groove 11 as shown in FIG. 13B.

When the push rod 4 is further pulled toward the operator's side at the first projecting position and projected up to the second projecting position shown by a two-dot-and-dash-line in FIG. 1, although the arm portion 15b of the first transmission pin 15 moves toward the operator's side on the cam surface D1 of the heart-shaped cam groove 10, the arm portion 16b of the second transmission pin 16 moves from the cam surface D3 of the circulating type cam groove 11 to the cam surface C2 of the escape groove 12. Then, when the knob 14 of the push rod 4 is pushed in the direction of the push position from the second projecting position, although the push rod 4 is held at the push position again because the arm portion 15b of the first transmission pin 15 is locked to the cam surface B1 of the heart-shaped cam groove 10 passing through the cam surface C1 thereof from the cam surface D1 as shown in FIG. 13D, the arm portion 16b of the second transmission pin 16 moves from the cam surface C2 of the escape groove 12 to the cam surface A2 thereof through the cam surfaces J, E2, D2, L thereof and the arm portion 16b does not press the receiving portion 13b of the drive plate 13 in the above moving process. Therefore, the eject arm 5 is not turned and the socket contacts of the IC card 1 are kept inserted into the pin contacts of the pin housing 2 under pressure. Note, since the state shown by FIG. 13G is entirely the same as that shown in FIG. 12B, operations similar to those shown in FIG. 12C to FIG. 12H in the aforesaid ordinary operation mode are carried out by pushing the push rod 4 forward again at the push mode after it is moved from the second projecting position and held at the push position.

As apparent from the above description, when the push rod 4 is projected up to the first projecting position and then pushed in the direction of the push position, since the press force of the push rod 4 is transmitted to the drive plate 13 through the second transmission pin 16 which traces the circulating type cam groove 11, the IC card 1 can be discharged. On the other hand, when the push rod 4 is erroneously projected up to the first projecting position regardless of that the discharge of the IC card 1 is not desired, for example, when one of two eject mechanisms which are disposed to upper and lower levels is erroneously actuated in place of the other of them to be actuated, the second transmission pin 16 is turned and caused to trace the escape groove 12 in place of the circulating type cam groove 11 by that the push rod 4 is projected from the first projecting position to the second projecting position and pushed in the direction of the push position and thus the drive plate 13 is not operated by the second transmission pin 16. Accordingly, the discharge operation of the IC card 1 can be canceled and its loaded state can be maintained.

FIG. 14 is a view describing the heights of the respective cam surfaces of a heart-shaped cam groove, a circulating type cam mechanism and an escape groove provided with an IC card connector device according to a second embodiment of the present invention and FIG. 15 is a view describing an ordinary eject operation of the IC card connector device, wherein parts corresponding to those in FIG. 1 to FIG. 13 are denoted by the same numerals.

The second embodiment is different from the aforesaid first embodiment in that an inclined surface portion is formed to the cam surface C3 of a circulating type cam groove 11 as shown in FIG. 14 and the arrangement of the second embodiment other than the above is fundamentally the same as that of the first embodiment. With the formation of the inclined surface portion to the cam surface C3 of the circulating type cam groove 11, the track of a second transmission pin 16 is displaced by the inclined surface portion of the cam surface C3 at a final step for discharging the IC card 1, more specifically, in the state shown in FIG. 15F, so that an arm portion 16b moves from the cam surface C3 to a cam surface B2. Therefore, the confronting state of the arm portion 16b of the second transmission pin 16 and the receiving portion 13b of the drive plate 13 is released at the final step for discharging the IC card 1 and even if the user erroneously pushes both of the IC card 1 and a push rod 4 at the same time in the state shown in, for example, FIG. 15F, the arm portion 16b of the second transmission pin 16 is only moved from the cam surface B2 of the circulating type cam groove 11 to the cam surface A2 thereof and the deformation of the arm portion 16b of the second transmission pin 16 caused by the unnatural force applied from the receiving portion 13b of the drive plate 13 can be prevented.

Figures 15A, 15B, 15C, 15D, 15E, 15F, 15G, 15H:
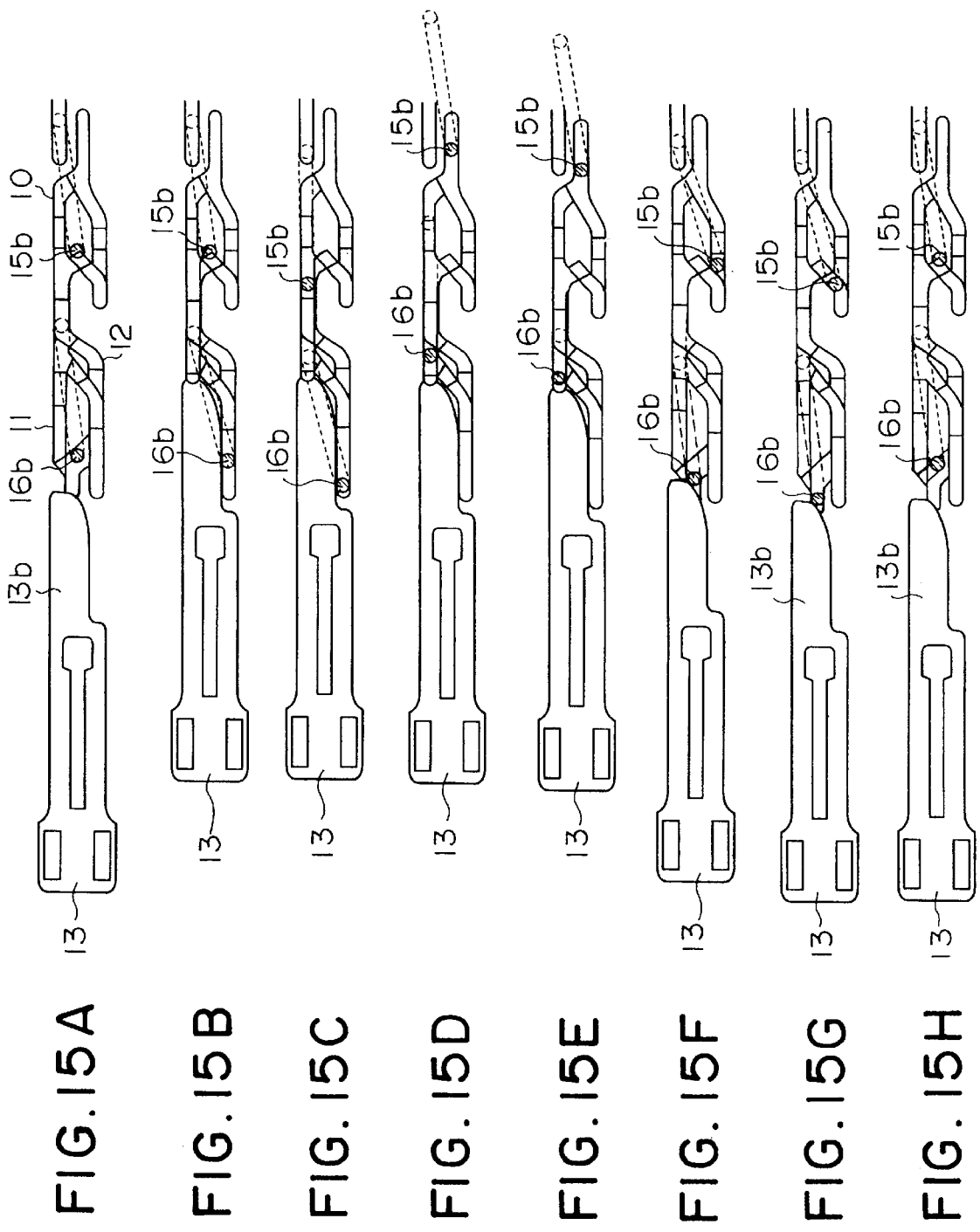
FIGS. 15A–15H is a view describing an ordinary eject operation of the IC card connector device.

Further, the second embodiment is arranged such that after the arm portion 16b of the second transmission pin 16 falls from the cam surface D3 of the circulating type cam groove 11 to the cam surface C3 thereof at the final step of the discharge operation of the IC card 1, the arm portion 15b of a first transmission pin 15 falls from the cam surface D1 of a heart-shaped cam groove 10 to the cam surface C1 thereof. That is, as shown in FIG. 15F to FIG. 15H, when the arm portion 16b of the second transmission pin 16 falls from the cam surface D3 of the circulating type cam groove 11 to the cam surface C3 thereof, the arm portion 15b of the first transmission pin 15 is located on the cam surface D1 of the heart-shaped cam groove 10 and after the arm portion 16b moves from the cam surface C3 of the circulating type cam groove 11 to the cam surface B2 thereof, the arm portion 15b falls from the cam surface D1 of the heart-shaped cam groove 10 to the cam surface C1 thereof and is locked to the cam surface B1 thereof. When priority is provided with the timing of the cams of the heart-shaped cam groove 10 and the circulating type cam groove 11 as described above, even if such irregular operation that the discharge operation of the IC card 1 is interrupted by any reason from the states shown in FIG. 15E to FIG. 15F and inserted again is carried out, only the state shown in FIG. 15D is restored and the receiving portion 13b of the drive plate 13 does not unnaturally press the arm portion 16b of the second transmission pin 16.

On the other hand, when the above timing is reversed and such irregular operation that the discharge operation of the IC card 1 is interrupted just after the arm portion 15b of the first transmission pin 15 falls from the cam surface D1 of the heart-shaped cam groove 10 to the cam surface C1 thereof and the IC card 1 is inserted again, since the arm portion 15b of the first transmission pin 15 is locked to the cam surface B1 of the heart-shaped cam groove 10 although the arm portion 16b of the second transmission pin 16 reversely traces the cam surface D3 of the circulating type cam groove 11, a problem arises in that a force is transmitted from the drive plate 13 to the first transmission pin 15 through the second transmission pin 16 and the push rod 4 and the cam surface B1 of the heart-shaped cam groove 10 is damaged.

Although the connector device on which two IC cards can be loaded are exemplified and described in the above respective embodiments, the present invention is also applicable to a connector device on which one or three or more IC cards can be loaded likewise.

The present invention executed in the above embodiments can achieve the following advantages.

When an IC card in an inserted state is discharged, after the push rod is projected from the push position to the first projecting position making use of the lock mechanism of the first transmission pin, the push rod is pushed in the direction of the push position at the first projecting position to thereby discharge the IC card by the second transmission pin. When the push rod is erroneously projected regardless of that the discharge of the IC card is not desired, after the push rod is further projected from the first projecting position up to the second projecting position which is nearer to the operator's side than the first position, the push rod is pushed in the direction of the push position at the second projecting position. As a result, since the second transmission pin is turned and the discharge of the IC card is cancelled, the eject mechanism excellent in operability can be realized and, in particular, the present invention can be preferably applied to an IC card connector device corresponding to a plurality of IC cards.

What is claimed is:

1. An IC card connector device comprising a frame for supporting an IC card so that it can be inserted and withdrawn, a push rod capable of reciprocating between a push position and first and second projecting positions and first and second transmission pins turnably attached to the push rod, wherein when the IC card is inserted, the push rod is located at the push position by the first transmission pin, the first transmission pin is released by a first push motion of the push rod in this state to thereby move the push rod to the first projecting position and the IC card is discharged by the second transmission pin in accordance with a second push motion of the push rod, wherein the push rod is permitted to move to the second projecting position which is further projecting from the first projecting position, when the push rod is located at the first projecting position, the push rod is moved to the second projecting position by a pull motion thereof and when the push rod is pushed at the second projecting position, the second transmission pin is turned to thereby cancel the discharge of the IC card.

2. The IC card connector device according to claim 1, further comprising a drive plate capable of performing a reciprocating motion, wherein said drive plate presses the push rod located at the first projecting position, the second transmission pin moves said drive plate and the IC card is discharged through said drive plate.

3. The IC card connector device according to claim 2, wherein when the push rod is located at the first projecting position, the second transmission pin confronts said drive plate and when the push rod is moved to the second push position by a push motion in the state that the push rod is located at the first projecting position, the second transmission pin moves said drive plate to thereby discharge the IC card, whereas when the push rod is pushed after it is moved from the first projecting position to the second projecting position, the confrontation between the second transmission pin and said drive plate is cancelled to thereby eliminate the movement of said drive plate caused by the movement of the second transmission pin to thereby cancel the discharge of the IC card.

4. The IC card connector device according to claim 3, comprising a circulating cam groove and an escape groove, wherein the second transmission pin traces said circulating cam groove and said escape groove in one direction and when the push rod is pushed at the second projecting position, the second transmission pin traces said escape groove to thereby cancel the confrontation of the second transmission pin and said drive plate.

5. The IC card connector device according to claim 4, wherein when the IC card is discharged, the track of the second transmission pin engaged with said circulating cam groove is displaced to thereby cancel the confrontation of the second transmission pin and said drive plate.

6. The IC card connector device according to claim 4, comprising a heart-shaped cam groove, wherein the first transmission pin traces said heart-shaped cam groove in one direction.

7. The IC card connector device according to claim 5, comprising a heart-shaped cam groove, wherein the first transmission pin traces said heart-shaped cam groove in one direction.

8. The IC card connector device according to claim 7, wherein after the second transmission pin engaged with said circulating cam groove discharges the IC card and falls to a next lower cam surface of said circulating cam groove, the first transmission pin engaged with said heart-shaped cam groove falls to a next lower cam surface of said heart-shaped cam groove.

9. The IC card connector device according to claim 7, wherein each of the first and second transmission pins is formed to a U-shape having an upper side portion and bent portions formed to both the ends of the upper side portion, first and second projections are formed to the push rod, the upper side portion of the first transmission pin is abutted against the first projection and the upper side portion of the second transmission pin is abutted against the second projection as well as one end of one of the bent portions of the first transmission pin is engaged with said heart-shaped cam groove and one end of one of the bent portions of the second transmission pin is engaged with said circulating cam groove and said escape groove and the first and second transmission pins are elastically pressed between the bent portion of the first transmission pin and the first projection and between the bent portion of the second transmission pin and the second projection.

10. The IC card connector device according to claim 9, wherein the bent portions formed to both the ends of each of the first and second U-shaped transmission pins are formed to the same length.

* * * * *